US008159544B2

(12) United States Patent
Lin et al.

(10) Patent No.: US 8,159,544 B2
(45) Date of Patent: Apr. 17, 2012

(54) METHOD FOR ADJUSTING PHOTOGRAPHING SETTINGS OF DIGITAL CAMERA THROUGH MOTION DETECTION

(75) Inventors: Horng-Horng Lin, Hsinchu County (TW); Hong-Long Chou, Taipei (TW); Chia-Chun Tseng, Hsinchu (TW)

(73) Assignee: Altek Corporation, Hsinchu (TW)

( * ) Notice: Subject to any disclaimer, the term of this patent is extended or adjusted under 35 U.S.C. 154(b) by 159 days.

(21) Appl. No.: 12/837,278

(22) Filed: Jul. 15, 2010

(65) Prior Publication Data

US 2011/0019013 A1 Jan. 27, 2011

(30) Foreign Application Priority Data

Jul. 22, 2009 (TW) ................................ 98124780 A

(51) Int. Cl.
*H04N 5/228* (2006.01)
*H04N 5/14* (2006.01)

(52) U.S. Cl. ............ 348/208.4; 348/208.1; 348/208.99; 348/699

(58) Field of Classification Search ............... 348/208.1, 348/208.4, 208.12, 208.14, 208.99, 699, 348/154, 155, 416.1; 382/103; 375/240.16
See application file for complete search history.

(56) References Cited

U.S. PATENT DOCUMENTS

| | | | | |
|---|---|---|---|---|
| 5,926,212 A * | 7/1999 | Kondo | ....................... | 348/208.4 |
| 6,212,237 B1 * | 4/2001 | Minami et al. | .......... | 348/E5.066 |
| 7,260,148 B2 * | 8/2007 | Sohm | ....................... | 375/240.16 |
| 7,447,337 B2 * | 11/2008 | Zhang et al. | .................. | 348/699 |
| 7,546,026 B2 * | 6/2009 | Pertsel et al. | ............ | 348/208.14 |
| 7,969,470 B2 * | 6/2011 | Kishida | ..................... | 348/208.14 |
| 2006/0078162 A1 * | 4/2006 | Wonneberger | ........... | 348/208.99 |
| 2009/0316044 A1 * | 12/2009 | Chen et al. | ..................... | 348/441 |
| 2010/0157072 A1 * | 6/2010 | Luo et al. | .................. | 348/208.4 |

* cited by examiner

*Primary Examiner* — Nhan T Tran
(74) *Attorney, Agent, or Firm* — Morris Manning & Martin LLP; Tim Tingkang Xia, Esq.

(57) ABSTRACT

A method for adjusting photographing settings of a digital camera through motion detection, for determine to adjust the photographing settings of the digital camera according to vibrations of the digital camera or shaking of a photographed object. The adjusting method includes the following steps. At least two continuous pre-photographed images are captured. A central area and an edge area are set at same positions in the pre-photographed images respectively. Feature points are found in the pre-photographed images. A local motion vector and a camera motion vector are respectively determined according to a relation of the feature points on the central area and the edge area. A subject motion vector is generated according to a difference between the local motion vector and the camera motion vector. Adjustment of the photographing settings of the digital camera is determined according to a maximum value in the subject motion vector and camera motion vector.

4 Claims, 11 Drawing Sheets

METHOD FOR ADJUSTING PHOTOGRAPHING SETTINGS OF DIGITAL CAMERA THROUGH MOTION DETECTION

CROSS-REFERENCE TO RELATED APPLICATIONS

This non-provisional application claims priority under 35 U.S.C. §119(a) on Patent Application No(s). 098124780 filed in Taiwan, R.O.C. on Jul. 22, 2009, the entire contents of which are hereby incorporated by reference.

BACKGROUND OF THE INVENTION

1. Field of Invention

The present invention relates to a method for adjusting settings of photographing a digital image, and more particularly, to a method for adjusting photographing settings of a digital camera through motion detection.

2. Related Art

With rapid development of digital cameras, many people record memorable moments through photographing. However, no matter for a film camera or a digital camera, due to instable holding of the camera by a user, a blurred image is usually generated during photographing. Hand shake problems to different extents exist in holding a camera by hands, and only each person has a different holding stability, causing involuntary displacement the instant a shutter is pushed. Therefore, in order to avoid blurring generated in a photographed image due to hand shakes, digital camera manufacturers correct blurred digital images through hardware or software.

For different digital camera manufacturers, different anti-shake mechanisms are added. A common anti-shake method is turning up photosensitivity (ISO), raising a shutter speed, or increasing an aperture value. All the various methods aim to reduce a shutter time during photographing, thereby reducing influences of hand shakes on digital images. However, all the methods have disadvantages. As for adjusting methods and hardware cost, adjusting photosensitivity is a cheaper method as compared with other methods. However, turning up photosensitivity generates larger noises, such that an imaging quality of a digital image is decreased. Adjusting the shutter time and the aperture value decreases an amount of light entering photosensitive components, so as to influence imaging brightness of the digital image.

In addition, factors influencing definition of a digital image further include motions of a photographed object. When the photographed object is shaking, if the object is photographed with a shutter time at a relatively low speed, the obtained digital image may be still a blurred image. Therefore, it is proposed to detect vibrations of a digital camera and shaking of a photographed object respectively at the same time. The photographing settings of the digital image is then compensated according to motion vectors of the two, thereby minimizing the causes influencing photographing.

In the prior art, a plurality of continuous mages are captured, and each pixel in the image is analyzed on camera vibrations or photographed object shaking according to the displacement in the continuous images. FIG. 1 is a schematic view of calculating pixels in a digital image in the prior art. The images at the upper left and the upper right in FIG. 1 are two continuous digital images 111, 112. Each pixel is analyzed, and motion changes of the camera and the photographed object may be effectively found (assuming that the photographed object is the human face in FIG. 1). In other words, the motion changes are the arrows at the lower part in FIG. 1. However, the calculation for all the pixels in the digital image causes an operational limit for digital cameras of common performances.

SUMMARY OF THE INVENTION

In view of the above problems, the present invention is a method for adjusting photographing settings of a digital camera through motion detection, which is applied in the digital camera for photographing a digital image, so as to determine shakes of the digital camera or a photographed object and determine to adjust the photographing settings of the digital camera.

In order to achieve the above objectives, the present invention provides a method for adjusting photographing settings of a digital camera through motion detection, which comprises the following steps. Two continuous pre-photographed images are captured. The two images are defined as a first pre-photographed image and a second pre-photographed image. A central area is set at the same position in the first pre-photographed image and the second pre-photographed image respectively. The central area further comprises a plurality of first image blocks. An edge area is set at the same position in the first pre-photographed image and the second pre-photographed image respectively. The edge area further comprises a plurality of second image blocks. The central area and the edge area do not superpose each other. A plurality of feature points is found according to the first image blocks and the second image blocks. A corresponding local motion vector is established from the first pre-photographed image and the second pre-photographed image according to each feature point. A camera motion vector is established by performing a similarity calculation program on a local motion vector selected in the edge area. A subject motion vector is generated according to a difference between the local motion vector and the camera motion vector. Photosensitivity when a digital image is photographed is adjusted according to a maximum value in the subject motion vector and the camera motion vector.

The present invention provides a method for recognizing vibrations of a digital camera or shakes of a photographed object through dynamic detection. When vibrations of the digital camera are detected, a camera motion vector (that is, vibrations of the digital camera) is subtracted from a subject motion vector (that is, shakes of the photographed object) in the digital image, so as to obtain a degree that the photographed object is shaking. Finally, the digital camera adjusts the photographing settings according to the result, thereby avoiding quality deterioration of the digital image due to direct adjustment of photographing settings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The present invention is applied in an electronic device capable of image processing, such as a personal computer, a digital video camera, and a digital camera. However, it should be noted that the present invention is not limited to the examples only.

Figure 1:
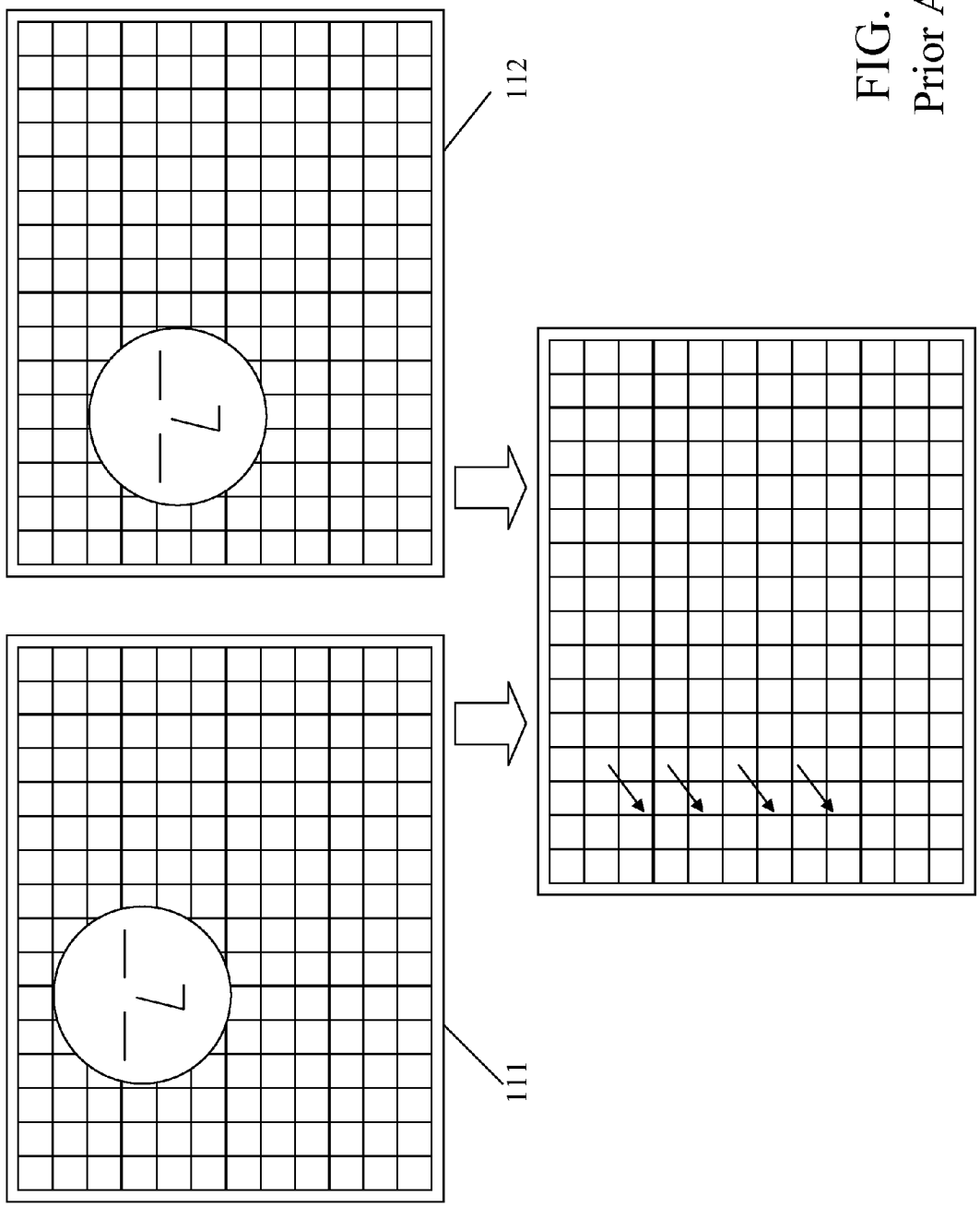
FIG. 1 is a schematic view of calculating pixels in a digital image in the prior art.
Figure 2:
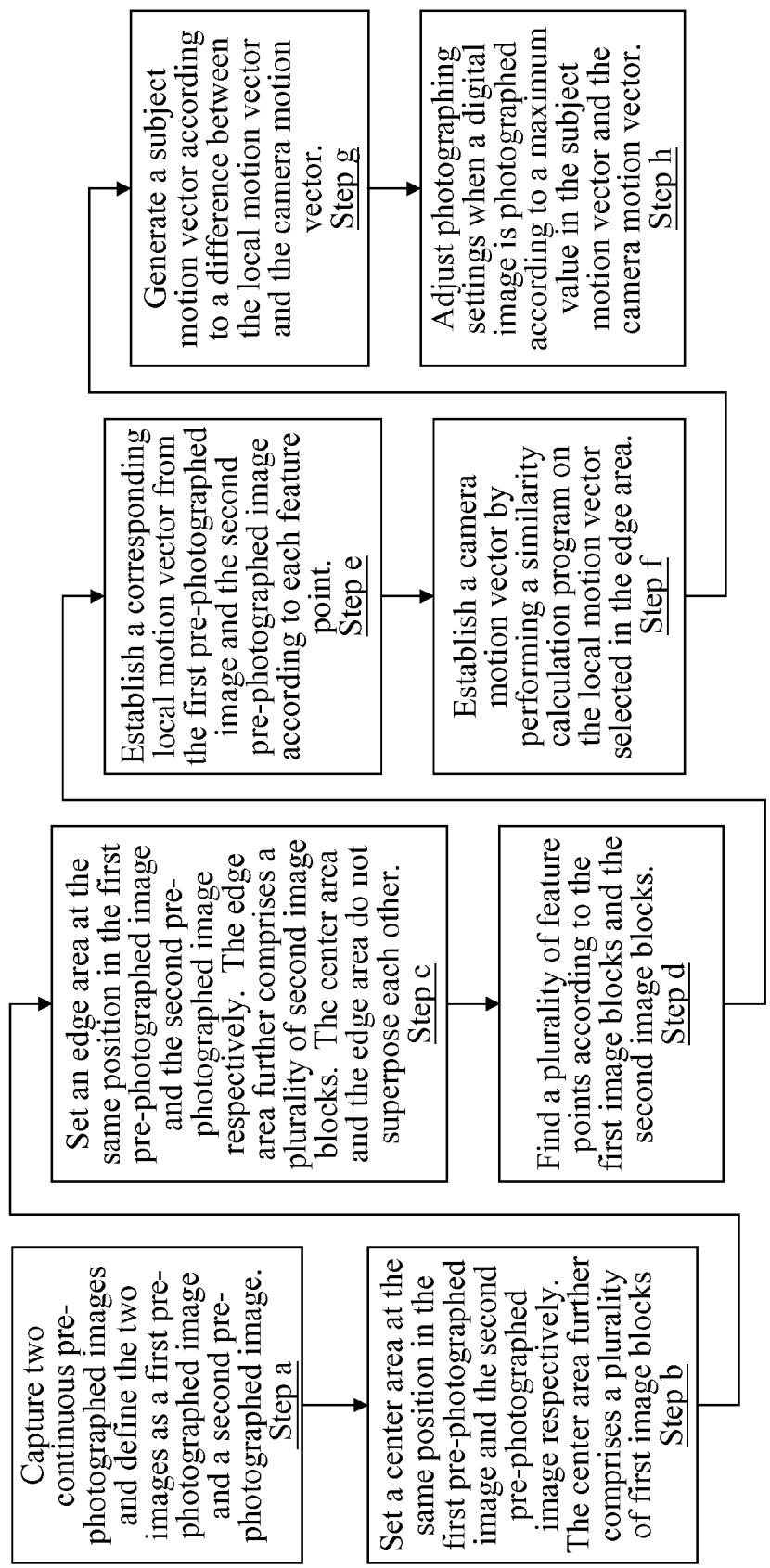
FIG. 2 is a schematic view of an operation process according to the present invention.

FIG. 2 is a schematic view of an operation process according to the present invention. The operation steps of the present invention are described as follows.

In Step a, two continuous pre-photographed images are captured and defined as a first pre-photographed image and a second pre-photographed image respectively.

In Step b, a central area is set at the same position in the first pre-photographed image and the second pre-photographed image respectively. The central area further comprises a plurality of first image blocks.

In Step c, an edge area is set at the same position in the first pre-photographed image and the second pre-photographed image respectively. The edge area further comprises a plurality of second image blocks. The central area and the edge area do not superpose each other.

In Step d, a plurality of feature points is found according to the first image blocks and the second image blocks.

In Step e, a corresponding local motion vector is established from the first pre-photographed image and the second pre-photographed image according to each feature point.

In Step f, a camera motion vector is established by performing a similarity calculation program on the local motion vector selected in the edge area.

In Step g, a subject motion vector is generated according to a difference between the local motion vector and the camera motion vector.

In Step h, settings when a digital image is photographed are adjusted according to a maximum value in the subject motion vector and the camera motion vector.

Figure 3A:
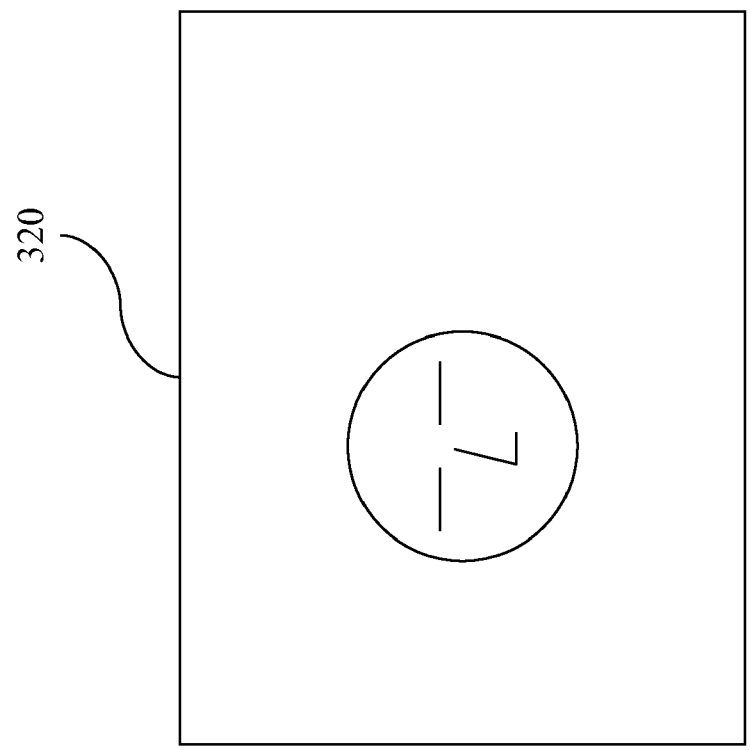
FIG. 3A is a schematic view of a first pre-photographed image and a second pre-photographed image.
Figure 3A:
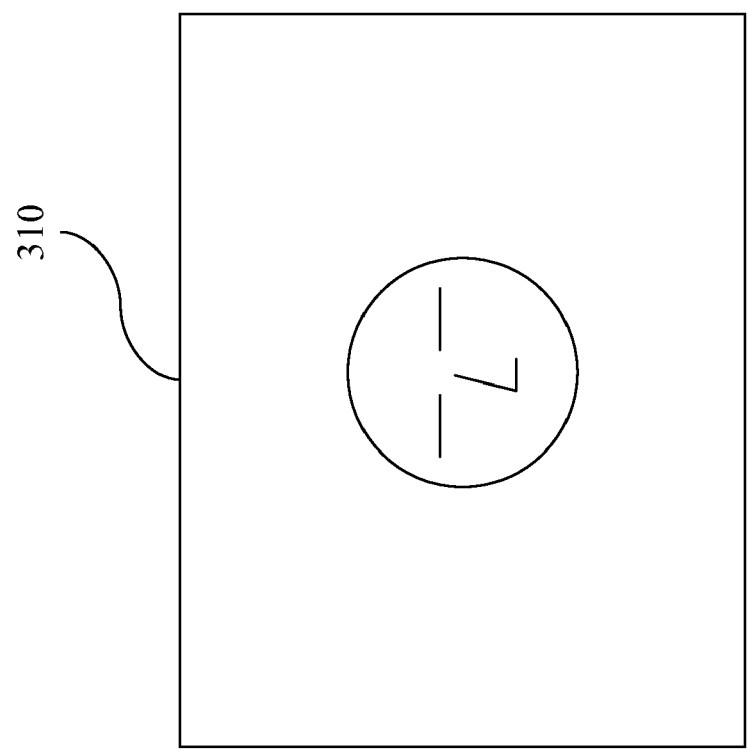
Figure 3B:
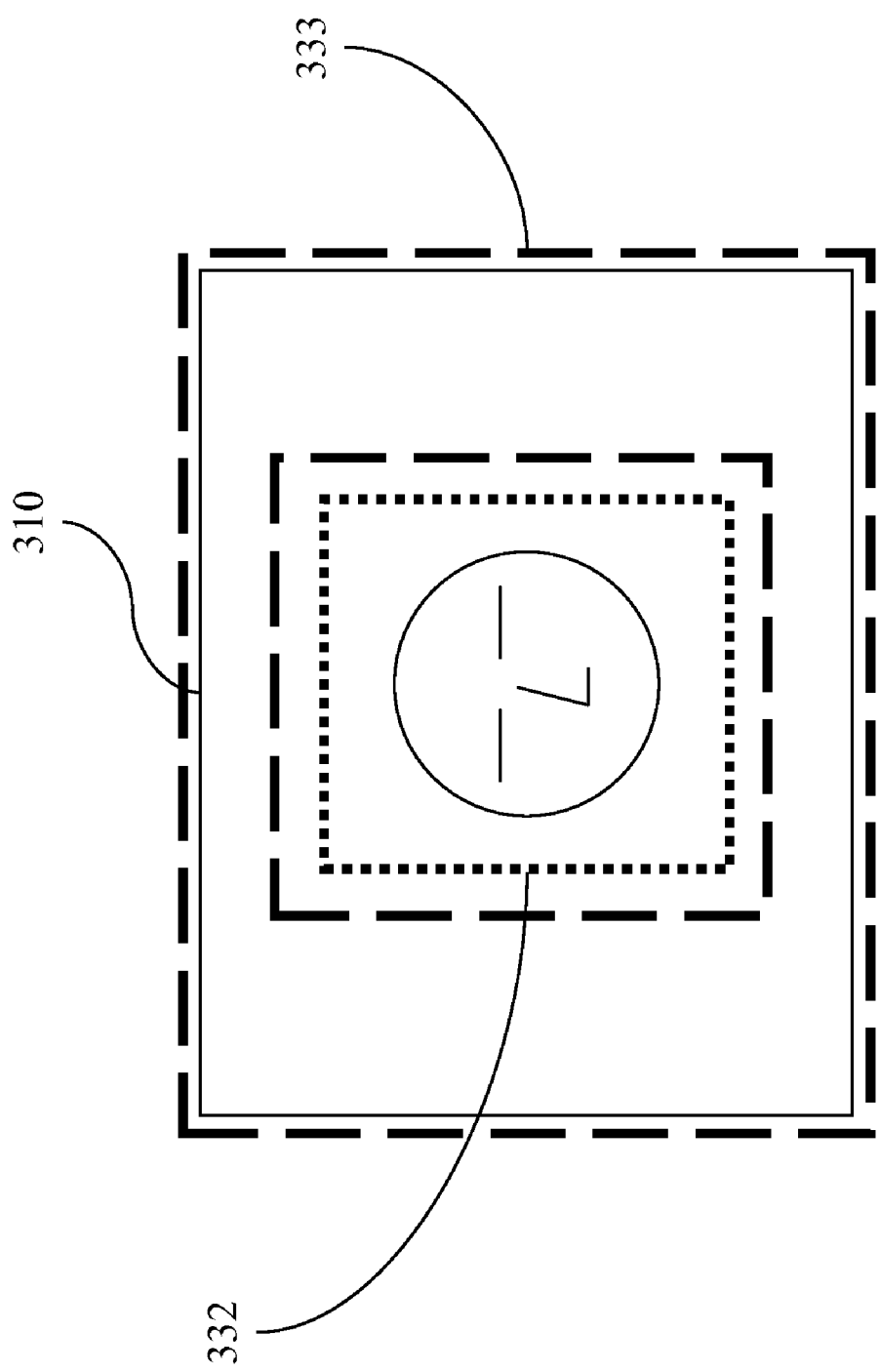
FIG. 3B is a schematic view of a central area and an edge area.

The present invention is not limited to estimating digital camera vibrations or photographed object shakes through two continuous images. The estimation may also be performed by capturing a plurality of continuous images. FIG. 3A is a schematic view of a first pre-photographed image and a second pre-photographed image. The first pre-photographed image 310 is on the left in FIG. 3A, and the second pre-photographed image 320 is on the right in FIG. 3A. Next, a central area 332 and an edge area 333 are set at the same positions in the first pre-photographed image 310 and the second pre-photographed image 320, respectively. In other words, the central area 332 selects the same position in the first pre-photographed image 310 and the second pre-photographed image 320 respectively. FIG. 3B is a schematic view of a central area and an edge area.

Figure 3C:
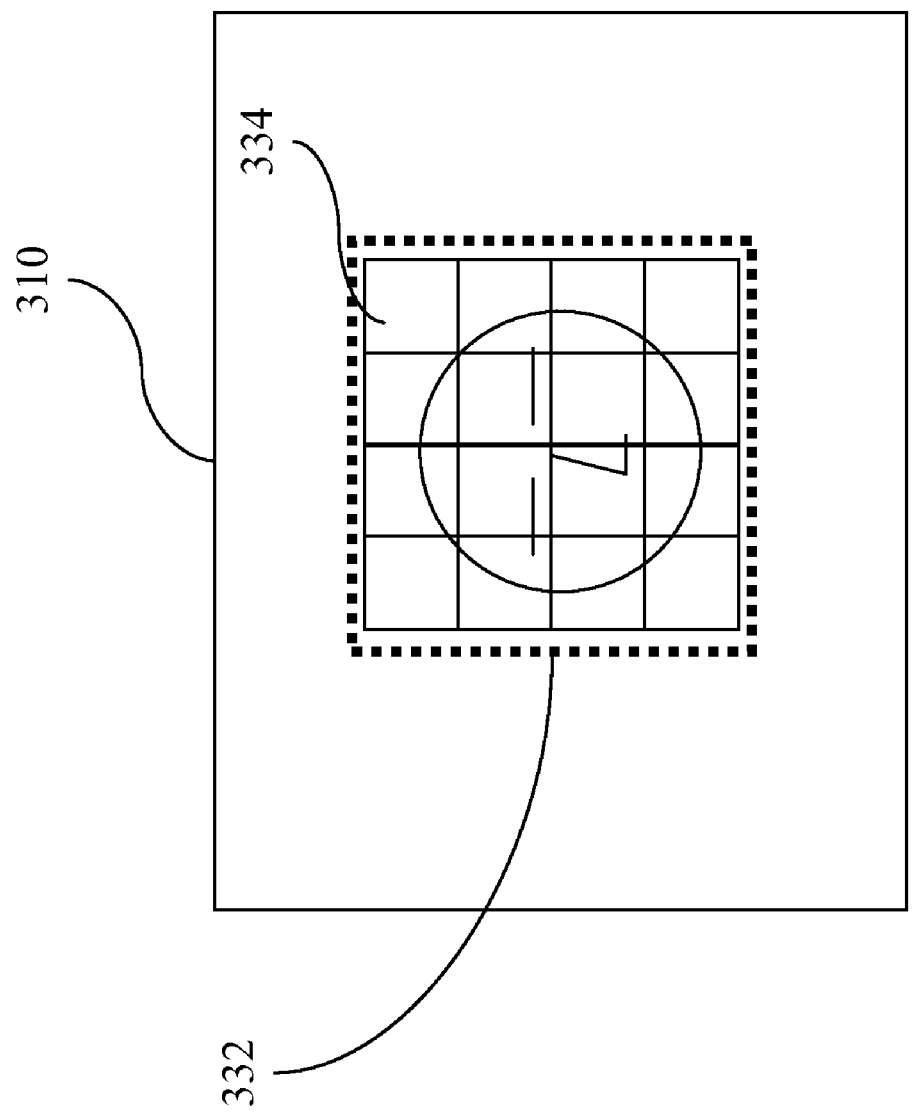
FIG. 3C is a schematic view of first image blocks.
Figure 3D:
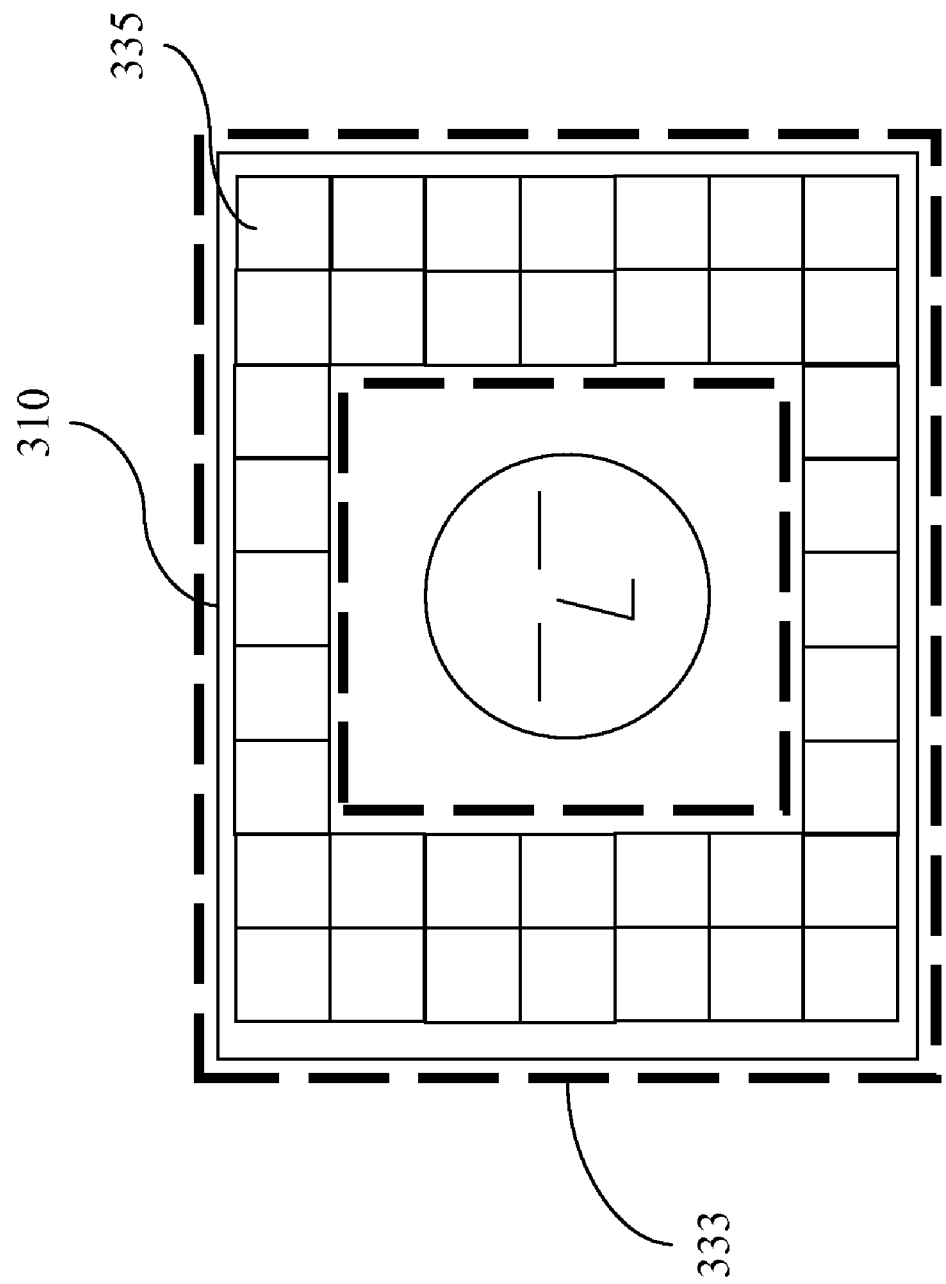
FIG. 3D is a schematic view of second image blocks.

In order to clearly illustrate a difference between the central area 332 and the edge area 333, the central area 332 in FIG. 3B is represented by a human face (a black short dashed-line box). The edge area 333 is shown by a black long dashed line box. Also, the central area 332 is further divided into a plurality of first image blocks 334. The edge area 333 is divided into a plurality of second image blocks 335. The amount of the first image blocks 334 and the amount of the second image blocks 335 are not limited. FIGS. 3C and 3D are schematic views of the first image blocks and the second image blocks.

Figure 4A:
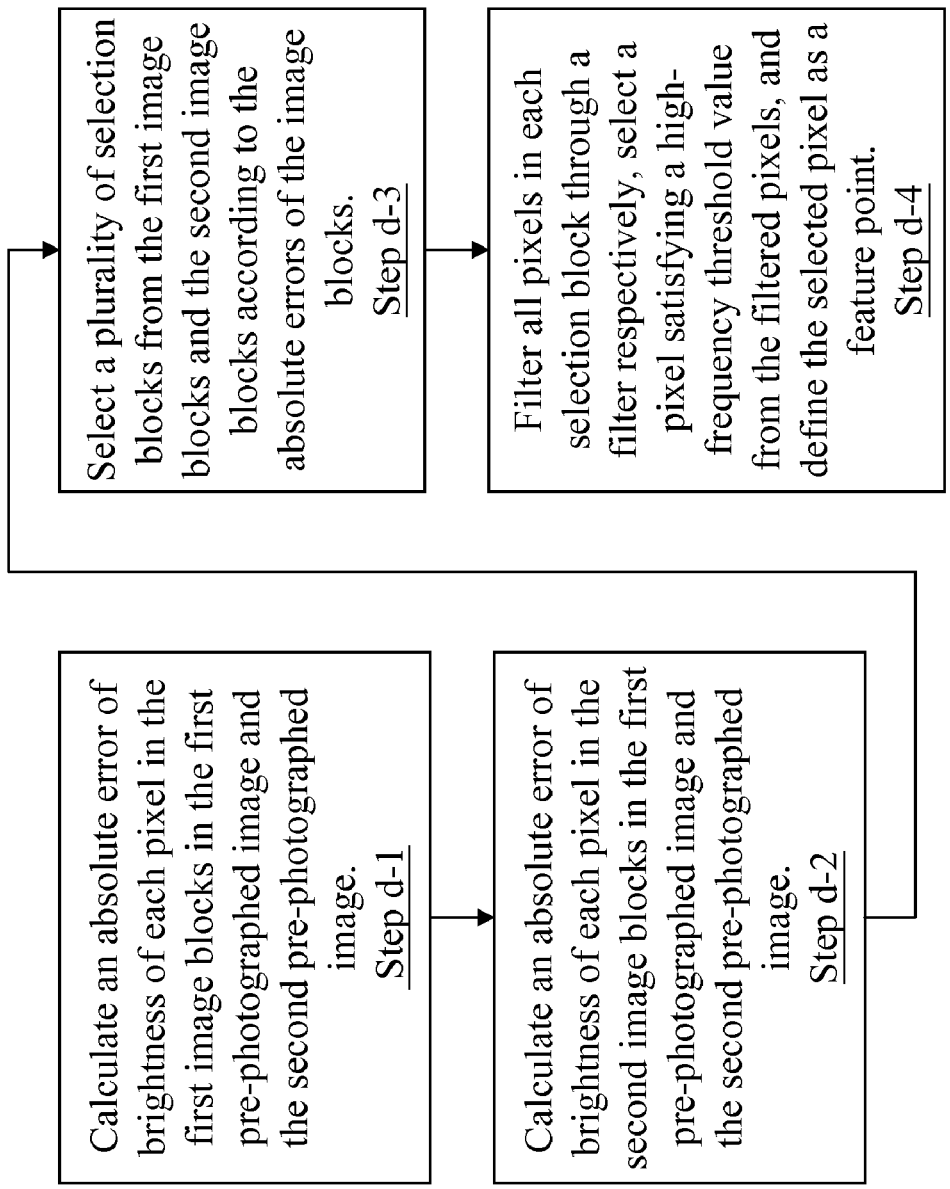
FIG. 4A is a schematic view of an operation process of selecting a feature point according to the present invention.

Determining the feature points in Step d further comprises the following steps, with reference to FIG. 4A at the same time.

In Step d-1, an absolute error of brightness of each pixel in the first image blocks in the first pre-photographed image and the second pre-photographed image is calculated.

In Step d-2, an absolute error of brightness of each pixel in the second image blocks in the first pre-photographed image and the second pre-photographed image is calculated.

In Step d-3, a plurality of selection blocks is selected from the first image blocks and the second image blocks according to the absolute errors of the image blocks.

In Step d-4, all pixels in each selection block are filtered respectively, and a pixel satisfying a high-frequency threshold value is selected from the filtered pixels and defined as a feature point.

Figure 4B:
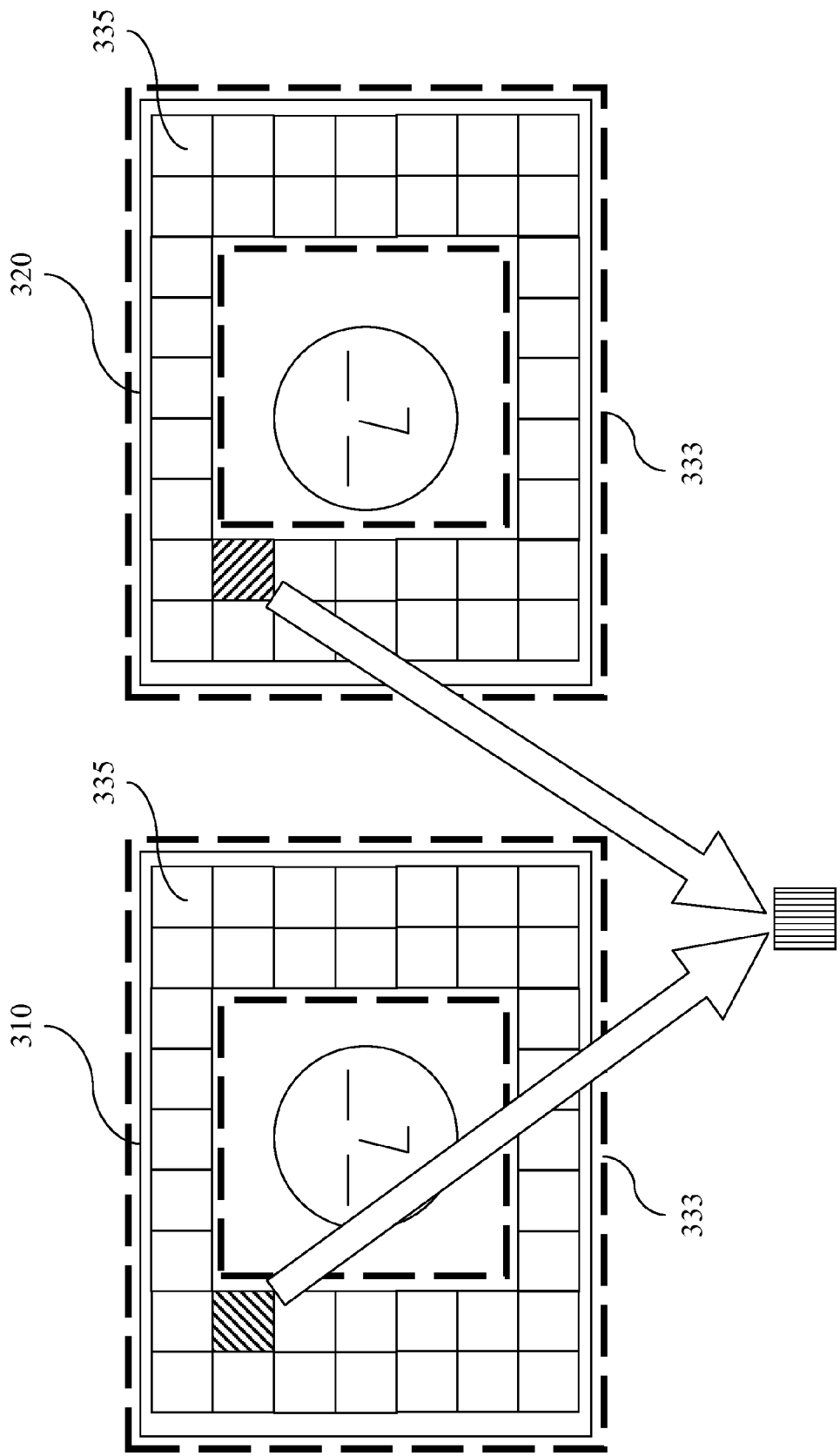
FIG. 4B is a schematic view of calculating an absolute error.

In Step d-1, the first image blocks 334 select the same position in the first pre-photographed image 310 and the second pre-photographed image 320 respectively. Next, an absolute error of brightness of each pixel in the first image blocks 334 in the first pre-photographed image 310 and the first image blocks 334 in the second pre-photographed image 320 is calculated. After the absolute errors of all first image blocks 334 are calculated, first image blocks 334 having an absolute error satisfying a threshold value is then selected. Similarly, the second image blocks 335 are selected in the same manner. FIG. 4B is a schematic view of calculating an absolute error. The first pre-photographed image 310 is on the left in FIG. 4B, and the second pre-photographed image 320 is on the right in FIG. 4B. The first pre-photographed image 310 and the second pre-photographed image 320 have the first image blocks 334 respectively. In Step d-1, absolute errors of the first image blocks 334 at the same positions are calculated respectively.

Next, the first image blocks 334 and the second image blocks 335 satisfying the settings are filtered. The filter is a Sobel filter or a sharpness filter, such that each pixel in the image blocks is filtered and calculated. A high-frequency pixel satisfying a filtering threshold value is then selected from the image blocks and defined as a feature point. In the present invention, not only one feature point is selected in each image block. If all the pixels in an image block do not satisfy the threshold value, no feature point is selected. On the contrary, if more than two pixels in an image block satisfy the threshold value, the pixel mostly satisfying the settings is selected as a feature point.

Figure 4C:
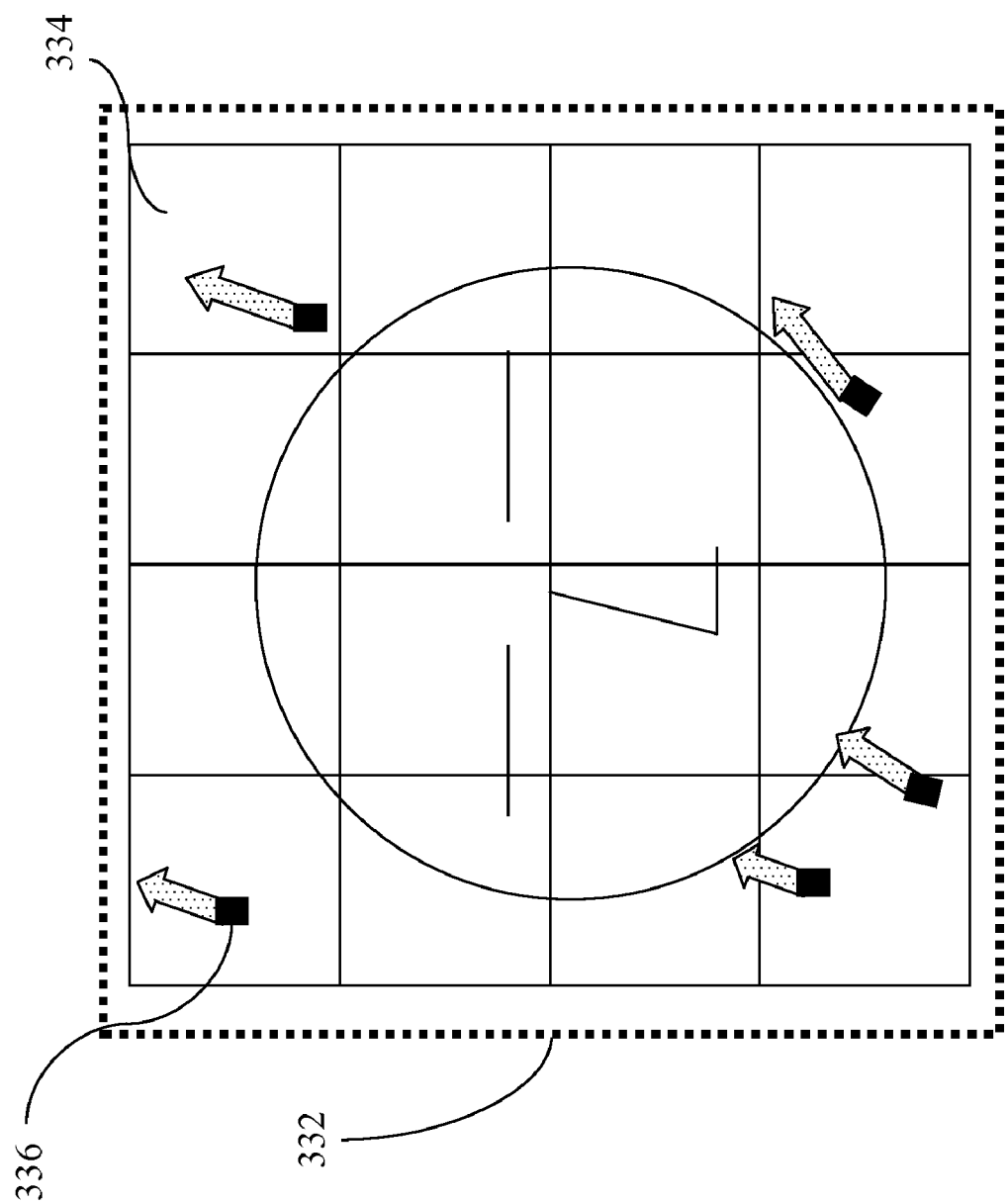
FIG. 4C is a schematic view of local motion vectors.

The selected feature points are compared through image similarity respectively. For example, the smaller a sum of absolute distance (SAD) is, the lower a similarity degree is. A local motion vector of each feature point from the first pre-photographed image 310 to the second pre-photographed image 320 is calculated. The local motion vector is generated based on a feature point on the first pre-photographed image 310 in combination with a motion of such a feature point 336 on the second pre-photographed image 320. FIG. 4C is a schematic view of a local motion vector. In FIG. 4C, a feature point 336 (a black block in FIG. 4C) in the central area 332 is taken as an example. The arrows represent local motion vectors.

Figure 4D:
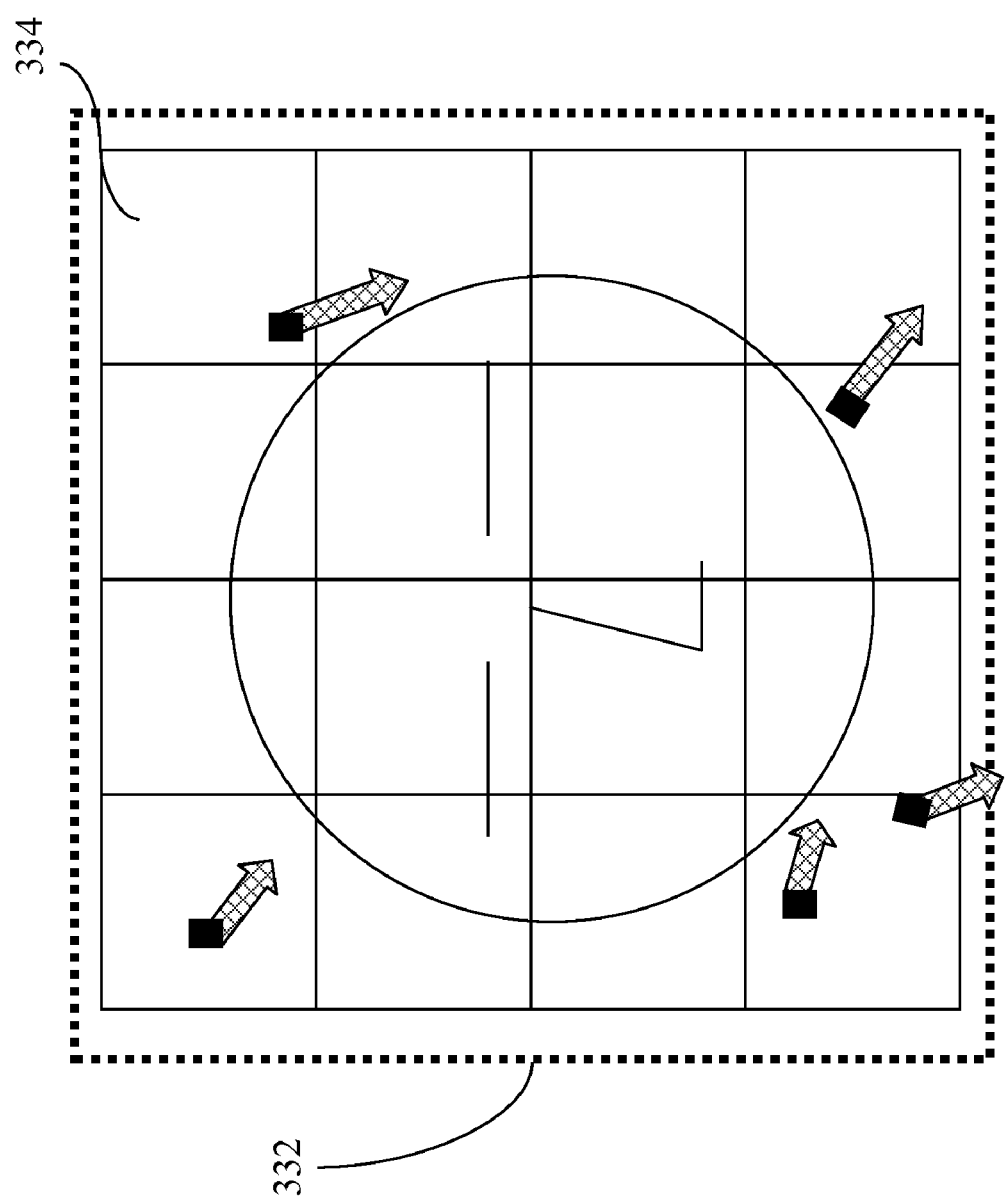
FIG. 4D is a schematic view of camera motion vectors.
Figure 4E:
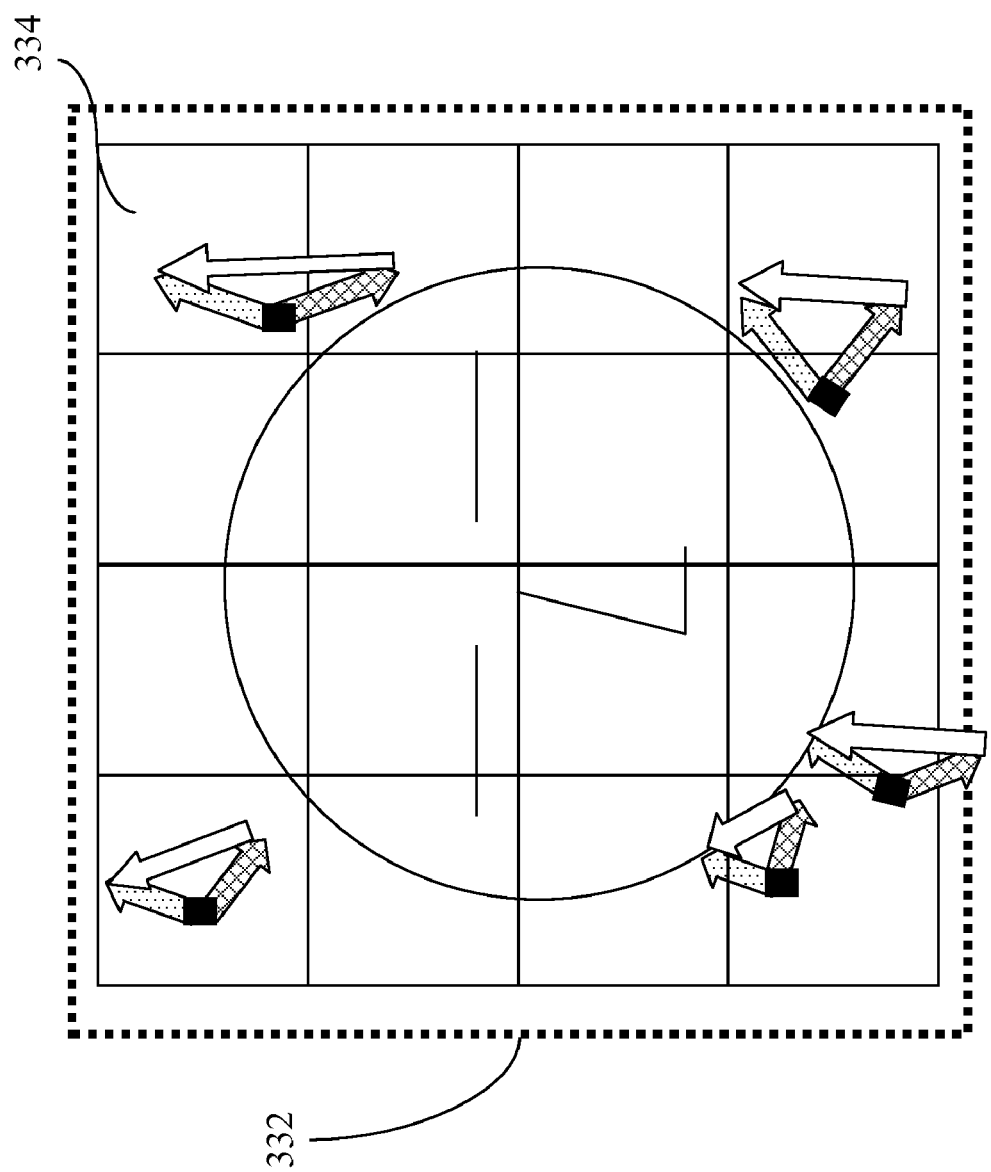
FIG. 4E is a schematic view of subject motion vectors.

A camera motion vector is established by performing a similarity calculation program on a local motion vector selected in the edge area 333. The camera motion vector indicates a direction and size of a digital camera vibration during photographing of the digital camera estimated according to the local motion vector. A model of the camera motion vector is represented by a 3×3 matrix. After such a 3×3 matrix is calculated, a camera motion vector of the feature point 336 of each block in the central area may be calculated again. FIG. 4D is a schematic view of camera motion vectors. Next, a subject motion vector is generated according to a difference between the local motion vector and the camera motion vector. FIG. 4E is a schematic view of subject motion vectors. In FIG. 4E, the subject motion vectors are represented by white arrows.

In the end, photographing settings when a digital image is photographed are adjusted according to a maximum value in the subject motion vector and the camera motion vector. The photographing settings include the photosensitivity, the aperture value, or the exposure value. If the motion vector is large, the photosensitivity is turned up and the exposure duration is decreased to reduce a probability of image blurring.

The present invention provides a method for recognizing vibrations of the digital camera or shakes of the photographed object through dynamic detection. When vibrations of the digital camera are detected, a camera motion vector (that is, vibrations of the digital camera) is subtracted from a subject motion vector (that is, shakes of the photographed object) in the digital image to obtain a degree of shakes of the photographed object. Finally, the digital camera adjusts the photographing settings according to the results, thereby avoiding quality deterioration of a digital image due to direct adjustment of the photographing settings.

What is claimed is:

1. A method for adjusting photographing settings of a digital camera through motion detection, applied in a digital camera for photographing a digital image, so as to determine to adjust the photographing settings of the digital camera according to shakes of the digital camera or a photographed object, comprising:
   capturing two continuous pre-photographed images, and defining the two images as a first pre-photographed image and a second pre-photographed image;
   setting a central area at the same position on the first pre-photographed image and the second pre-photographed image respectively, wherein the central area further comprises a plurality of first image blocks;
   setting an edge area at the same position on the first pre-photographed image and the second pre-photographed image respectively, wherein the edge area further comprise a plurality of second image blocks, and the central area and the edge area do not superpose each other;
   finding a plurality of feature points according to the first image blocks and the second image blocks;
   establishing a corresponding local motion vector from the first pre-photographed image and the second pre-photographed image according to each of the feature points;
   establishing a camera motion vector by performing a similarity calculation program on the local motion vectors selected in the edge area;
   generating a subject motion vector according to a difference between the local motion vector and the camera motion vector; and
   adjusting photosensitivity when the digital image is photographed according to a maximum value in the subject motion vector and the camera motion vector.

2. The method for adjusting photographing settings of a digital camera through motion detection according to claim 1, wherein the step of finding the feature points further comprises:
   calculating an absolute error of brightness of each pixel in the first image blocks in the first pre-photographed image and the second pre-photographed image;
   calculating an absolute error of brightness of each pixel in the second image blocks in the first pre-photographed image and the second pre-photographed image;
   selecting a plurality of selection blocks from the first image blocks and the second image blocks according to the absolute errors of the image blocks; and
   filtering all pixels in each of the selection blocks respectively, selecting a pixel satisfying a high-frequency threshold value from the filtered pixels, and defining the selected pixel as the feature point.

3. The method for adjusting photographing settings of a digital camera through motion detection according to claim 2, wherein the filter is a Sobel filter or a sharpness filter.

4. The method for adjusting photographing settings of a digital camera through motion detection according to claim 1, wherein an aperture value when the digital image is photographed is further adjusted according to a difference value between the subject motion vector and the camera motion vector.

* * * * *